Aug. 2, 1966 — R. L. SPRINGFIELD — 3,263,502
MULTIPLE THERMOCOUPLE SUPPORT

Filed Jan. 21, 1964 — 2 Sheets-Sheet 1

Redwood L. Springfield
INVENTOR.

BY

ATTORNEY

Aug. 2, 1966 R. L. SPRINGFIELD 3,263,502
MULTIPLE THERMOCOUPLE SUPPORT
Filed Jan. 21, 1964 2 Sheets-Sheet 2

Redward L. Springfield
INVENTOR.

BY

ATTORNEY

United States Patent Office 3,263,502
Patented August 2, 1966

3,263,502
MULTIPLE THERMOCOUPLE SUPPORT
Redwood L. Springfield, 3827 Sun Valley, Houston, Tex.
Filed Jan. 21, 1964, Ser. No. 339,194
8 Claims. (Cl. 73—341)

This invention is pertinent to the field involving the internal measurement of temperatures in chambers.

In a large number of commercial applications, the temperature needs be taken within a chamber, reactor or vessel, at plural points. Numerous types of temperature-takers are presently used, one of the most common being thermocouple devices. Such devices, as is well known, involve dissimilar conductive materials joined together at so called "hot" and "cold" junctions, respectively, measurements of induced potential then being taken, the induced potential being a measure of the temperature differential between the two junctions. Presently utilized devices include a plurality of thermocouples, each being utilized to indicate temperature at a precise point.

In such areas of application as in a refinery, vertically spaced thermocouples are used to indicate temperatures in a reactor. Said thermocouples are vertically spaced within a well, the well being built into the reactor. The well is usually supported by the upper reactor wall and hangs down into the reactor. Oftentimes, the reactor is quite tall, on the order of 80 to 100 feet. The well, in order to provide adequate temperature information, extends well down into the reactor and thus is quite long in itself.

Certain difficulties exist within the present state of the art with respect to the thermocouples, and the support therefor, as are inserted within a reactor well. These difficulties concern the duel requirement that, (1) the measuring device be stable and able to withstand wear and abrasive treatment, and (2) the measuring instruments and support be capable of insertion into the well and withdrawn therefrom. Since, as aforementioned the vessel or reactor well may be quite extended, present devices require the building or housing to have great height or clearance above the reactor itself. This space is required in order that a crane or hoist may elevate the thermocouple assembly above the well so that the full length of said assembly may be supported above the well before being lowered thereinto. For example, with a reactor 80 feet tall, installation requires a support which will elevate the thermocouple assembly to at least twice that height, or 160 feet.

This invention has, as one of its objects, the provision of a flexible thermocouple assembly.

A further object is the provision of a thermocouple assembly which may be bent and run into a reactor without requiring substantial elevation above the top of the well.

Another object is to permit construction of a thermocouple assembly of extreme length which may be bent or wrapped in such a manner as to be transported in an expeditious manner in trucks, railway cars or other means of transport.

And still another object is the provision of a thermocouple assembly designed to be flexibly resilient, of increased strength and resistant to binding between its support and the well wall.

These and other objects will become obvious on examining the following description and drawings, in which.

Figure 1:
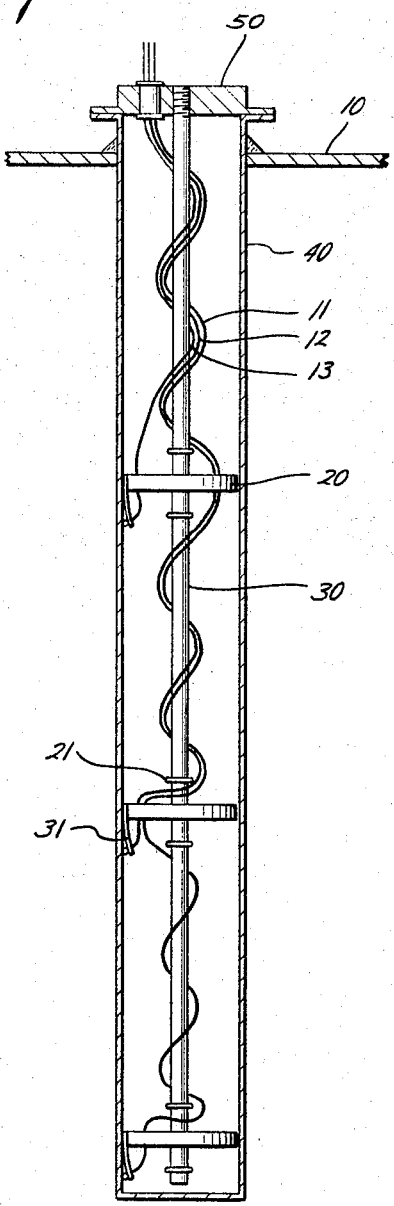
FIGURE 1 is a longitudinal view, partially in section, of the thermocouple assembly inserted within a vessel well.
Figure 3:
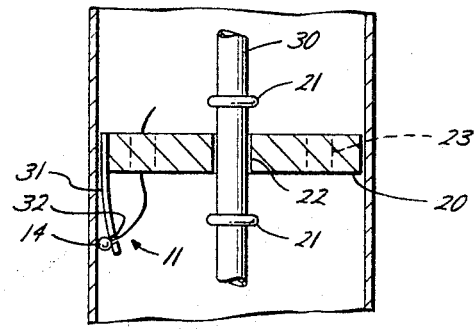

FIGURE 3 being a sectionalized view taken at III—III of FIGURE 1, and

Figure 4:
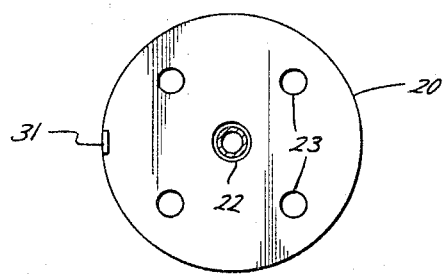
Figure 5:
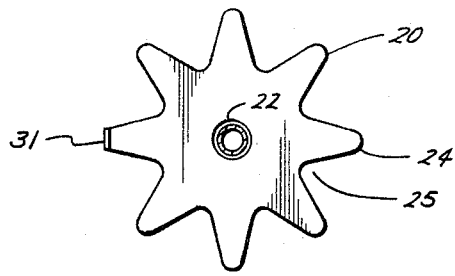

FIGURES 4 and 5 showing two types of spiders or placing devices used to position the hot thermocouple junction.

Directing your attention first to FIGURE 1, the upper wall of a reactor or other vessel is partially shown or illustrated at 10. Inserted within such a vessel is a well having a wall 40. The well commonly extends substantially into the interior of the vessel. Closure member 50 is depicted at the top open end of the well. Since any number of satisfactory closure members are available, this feature is unimportant as concerns the instant invention, said closure merely closing the well and providing some means of support for the hereinafter described thermocouple support.

Figure 2:
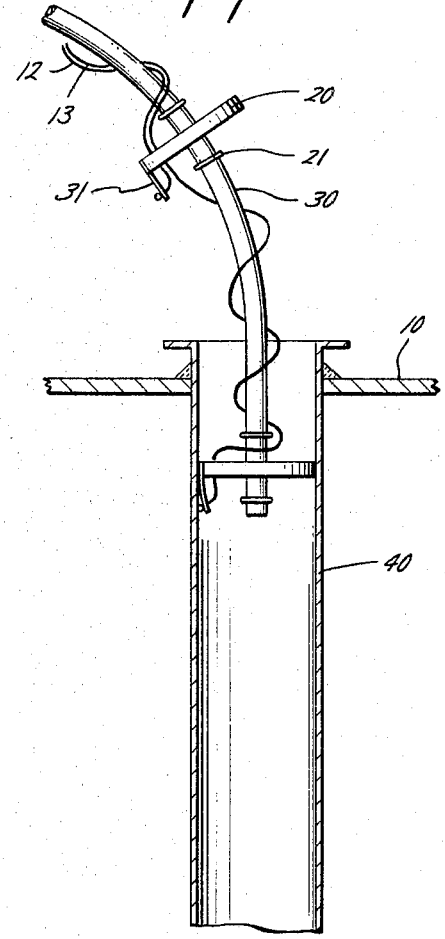
FIGURE 2 is a perspective of a portion of the thermocouple support having several thermocouple leads wrapped therearound, said support being bent as in the insertion process.

Adapted to be inserted within said well is a flexible thermocouple support 30. Member 30, being flexible, is capable of being bent, see FIGURE 2, for example a hollow bar, such as one of aluminum. Helically wound or wrapped around support 30, are a plurality of thermocouple cables or leads, such as are illustrated at 11, 12 and 13. These leads are shown to enter the well through closure member 50. Outside, the leads may be connected to a known type of measuring instrument so as to indicate temperatures at different levels of said reactor.

At some initial level below upper reactor wall 10, a spider or positioning means 20 is depicted. This element is designed to not only position a hot thermocouple junction against the inside surface 40 of the well, but also to serve as a guide for the thermocouple leads. At this point, it goes without saying that each thermocouple cable may possess two electrical conduits respectively being of dissimilar elements. One form, the preferred one, of spider 20, is shown by FIGURE 4 to be substantially ring shaped, have an interior circular cut out 22 to permit insertion on and around support 30, and a plurality of spaced drills or bores 23. These bores 23 permit passage through spider 20 of the thermocouple cables. In this manner the cables may be kept from binding with resultant excessive strain and ultimate rupture. Another possible type of spider is illustrated by FIGURE 5, having the same support accommodating means 20, and a plurality of spaced radially extending legs 24 leaving spaces or gaps 25 therebetween. These spaces serve the same purpose as bores 23 of FIGURE 4.

Looking now at FIGURE 1, and especially FIGURE 3, at the radially exterior edge of spider 20, there is affixed thereto a spring-type bracket assembly 31. A thermocouple cable will pass through one of bores 23 or spaces 25 of spider 20, then through channel or opening 32 near one end of bracket 31, and be pressed thereby against the interior of well wall 40. This bracket may be of the leaf spring type, or may be bi-metallic such as the mounting described in my U.S. Patent No. 3,015,234. In any case, when the temperature reading is desired, hot junction 14 is pressed against wall 40, providing an indication of the temperature within the reactor. A plurality of such spiders, brackets and thermocouple junctions are shown to be spaced along the length of flexible support 30.

Turning again to FIGURE 3, cut-out or support accommodating means 22 is shown to have a slightly larger diameter than that of support 30. This permits vertical sliding or movement of spider 20 with respect to support 30. Spaced both above and below spider 20 on support 30 are motion limiting means 21. These may take the form of lugs or welds on support 30, said lugs having a depth greater than the excess of the diameter of spider 20 over that of support 30. Thus the sliding or movement of spider 20 is limited by limiting means 21.

Now, consider the operation of the instant invention. The various thermocouple cables are helically wrapped or wound around the flexible support member 30. Support members such as hollow aluminum pipes are flexible enough so that they may be, in actuality, bent around on themself, forming a vertical loop. Thus while a complete thermocouple assembly may be substantially longer than a railroad flat car, this device may be made compact enough to be readily transported by such means. Consider now insertion of the assembly into a reactor well. Instead of requiring a hoist to vertically drop the assembly into the well, a man may position himself atop the well, grasp the lower end of the assembly, and hand over hand, lower the assembly into the well. This obviates the necessity for excessive clearances above the well and mechanical equipment used to lower a thermocouple assembly into the well. While lowering the assembly into the well and on reaching its ultimate destination, it, the assembly, is subject to a multitude of damaging stresses. The very fact that the support member is flexible, i.e. it can give, counteracts these stresses. The fact that the cables or leads are helically wound adds still greater flexibility. Were the cables simply vertically hung around the support member, such flexibility would not be possible. The tendency to bend in one direction would be counter-balanced by internal tension in the cables on the opposite sides. Further mobility is provided by spiders 20. While they serve to position the cables or leads by passageways 23 or 25, they also may "give" when faced with a force. This is accomplished by making them slidably engageable, within the limits of lugs 21, with support member 30. In fact, since the internal diameter of opening 22 is greater than the external diameter of member 30, the spiders may cant to a certain extent.

Thus, it is seen that all the expressed objectives, and more, of this invention are met by this invention. While preferred configurations have been described, others will be obvious to one having skill in the art. It is the intent to limit the scope of this invention only by the following claims in which I claim:

1. In a thermocouple assembly to be inserted within a well the combination of:
    a centrally disposed flexible support means;
    a plurality of thermocouple cable means, each having a thermocouple junction, and helically wrapped around, but non-integral with, said support means; and
    means for positioning said cable means said positioning means being engageable with and substantially encircling said support means when said assembly is being inserted within said well and said positioning means being of lesser unstressed diameter than the internal diameter of said well.

2. In a thermocouple assembly to be inserted in a well the combination of:
    flexible support;
    a plurality of thermocouple cable means helically wrapped around but non-integral with said support means, each of said cable means including a thermocouple junction;
    means for positioning said cable means, said positioning means being slidably and encirclingly engageable with said support means when said assembly is being inserted within said well, said positioning means being of lesser unstressed diameter than the internal diameter of said well; and
    spring means appended to said positioning means, for forcing said junctions in a radially outward direction from said support member.

3. The combination of claim 2 wherein:
    there is one of said spring means appended to each of said junctions.

4. The combination of claim 2 wherein:
    said positioning means includes a plurality of vertically spaced centrally open substantially ring-shaped members, each of said ring-shaped members having at least one opening, exterior of its central opening, for passage therethrough of said cable means.

5. The combination of claim 2 wherein:
    said positioning means includes a plurality of spaced centrally open spiders, each of said spiders having a plurality of cable accommodating passageways radially exterior of said central opening.

6. A heat measuring device designed to be inserted within a reactor well having a wall comprising:
    a flexible support member;
    a plurality of cables helically wrapped around but non-integral with said support member, each of said cables including a hot thermocouple junction at one end of said cable and leads therefrom within said cable;
    a plurality of vertically spaced positioning means on said support member, each of said positioning means having limitedly slidable engageability within said support member, and each of said positioning means having passageways therethrough to accommodate and position said cables; and
    outwardly directed bracket means for causing one of said junctions to contact said well wall affixed to at least some of said positioning means.

7. The device of claim 6 including:
    spaced motion limiting means affixed to said support member adjacent at least some of said positioning means for limiting the movement of said positioning means relative to said support member.

8. The device of claim 6 wherein:
    said support member is sufficiently flexible so as to permit said device to be inserted within said well in such a manner that the axis of the device may substantially curve away from the axis of the well during insertion.

References Cited by the Examiner

UNITED STATES PATENTS

| | | | |
|---|---|---|---|
| 1,365,465 | 1/1921 | Isles | 73—341 |
| 3,015,234 | 4/1962 | Springfield | 73—359 |
| 3,174,342 | 3/1965 | Werner et al. | 73—362 |

LOUIS R. PRINCE, *Primary Examiner.*

C. CELLS, S. H. BAZERMAN, *Assistant Examiners.*